US005525184A

United States Patent [19]

Luff et al.

[11] Patent Number: 5,525,184

[45] Date of Patent: Jun. 11, 1996

[54] LABEL DISPENSER WITH SELECTABLE DISPENSE MODES INCLUDING AN ON-DEMAND MODE

[75] Inventors: Ruth A. Luff, Miamisburg; Donald A. Morrison, Dayton; Richard D. Wirrig, Kettering, all of Ohio

[73] Assignee: Monarch Marking Systems, Inc., Dayton, Ohio

[21] Appl. No.: 134

[22] Filed: Jan. 4, 1993

[51] Int. Cl.[6] .................... B32B 31/00

[52] U.S. Cl. .................... 156/361; 156/362; 156/363; 156/384; 156/541; 156/542

[58] Field of Search .................... 156/361, 362, 156/363, 384, 541, 542; 221/71, 73

[56] References Cited

U.S. PATENT DOCUMENTS

| | | | |
|---|---|---|---|
| 3,601,042 | 8/1971 | Hamisch | 156/384 |
| 3,840,422 | 10/1974 | Fincke . | |
| 4,264,396 | 4/1981 | Stewart | 156/361 |
| 4,435,246 | 3/1984 | Green | 156/363 |
| 4,591,404 | 5/1986 | Hamisch | 156/384 |
| 4,623,418 | 11/1986 | Gombrich et al. | 156/384 |
| 4,652,317 | 3/1987 | Seestrom | 156/361 |
| 4,652,330 | 3/1987 | Gerbaud et al. | 156/361 |
| 4,706,096 | 11/1987 | Sato | 156/384 |
| 4,813,355 | 3/1989 | Stork | 156/384 |
| 5,049,228 | 9/1991 | Sato | 156/361 |
| 5,149,211 | 9/1992 | Pettigree et al. | 156/384 |

FOREIGN PATENT DOCUMENTS

| | | |
|---|---|---|
| 0191495 | 8/1986 | European Pat. Off. . |
| 0250910 | 1/1988 | European Pat. Off. . |
| 0456999 | 11/1991 | European Pat. Off. . |

*Primary Examiner*—Chester T. Barry
*Attorney, Agent, or Firm*—McAndrews, Held & Malloy, Ltd.

[57] ABSTRACT

A label dispenser in the form of a hand held labeler is shown that is selectively operable in a number of dispense modes. The dispense modes include an on-demand mode in which labels are automatically printed and dispensed as previously printed labels are removed from the labeler. In a manual mode, the labeler is responsive to the manual actuation of a trigger switch to print and dispense a label. The labeler is also responsive to an on line trigger command received from a host device to print and dispense a label. Further, a strip mode allows strips of labels to be automatically printed on demand or in response to the actuation of the trigger switch. An on-demand sensor is employed to detect the presence or absence of a label dispensed from the labeler in the on-demand modes. Further, the quantity of labels or strips of labels automatically dispensed in the on-demand modes may be limited to a specified quantity.

33 Claims, 7 Drawing Sheets

LABEL DISPENSER WITH SELECTABLE DISPENSE MODES INCLUDING AN ON-DEMAND MODE

TECHNICAL FIELD

The present invention is directed to a label dispenser and more particularly to a label dispenser or labeler that is selectively operable in a plurality of dispensing modes including an automatic dispense or on-demand mode and a manual dispense mode.

BACKGROUND OF THE INVENTION

Dispensers are known for dispensing preprinted tags and labels. A tag printer and dispenser is shown in U.S. Pat. No. 3,601,042 wherein the number of tags as well as the number of tag parts that can be printed and dispensed is user selectable. A labeler is a type of label dispenser that includes a printer to print information on a label before the label is dispensed. Label dispensers are known to operate in an automatic dispense or on-demand mode wherein as soon as a dispensed label is removed from the dispenser, another label is automatically dispensed or printed and dispensed. U.S. Pat. No. 3,840,422 shows one such device in the form of a hand held labeler wherein contact between an applicator roll of the labeler and an article to be labeled causes, through a mechanical linkage, a second label to be automatically printed as a previously dispensed label is being applied to the article. As the labeler is removed from the article, the mechanical linkage causes the second label that was just printed to be fed forward to the applicator. Other label dispensers are known that include a trigger switch wherein manual actuation of the trigger switch causes a label to be dispensed and printed or dispensed. Still other labeler dispensers are known which can dispense a label or print and dispense a label in response to an on-line command from a host device such as a host computer. However, no label dispenser is known that allows a user to selectively operate the dispenser in one of a number of dispensing modes.

SUMMARY OF THE INVENTION

In accordance with the present invention, the disadvantages of prior label dispensers and labelers have been overcome. The label dispenser of the present invention is selectively operable in a number of dispensing modes including an automatic dispense mode and a manual dispense mode to provide a label dispenser that is flexible for operation in various environments, easy to operate and that requires minimal user input in order to dispense or print and dispense labels.

More particularly, in order to operate the label dispenser of the present invention in a particular dispense mode, a mode selected from a number of available dispensing modes is input or entered into the dispenser. A controller of the label dispenser then controls the dispensing of labels from the label dispenser in response to the detection of various dispense initiation events depending upon the selected dispense mode.

In an automatic dispense mode, the label dispenser is controlled to automatically dispense at least one label in response to a detected absence of a label dispensed from the dispenser so that as a first label is removed from the label dispenser, the label dispenser automatically dispenses another label. In a manual mode, the controller is responsive to the actuation of a manual actuator mounted on the label dispenser to control the dispenser to dispense at least one label. In an on-line mode, the controller is responsive to the receipt of an initiate label dispensing command received from a host device to control the dispenser to dispense a label. In a strip mode, the controller may control the dispenser to dispense a continuous strip of labels. More particularly, in response to the selection of an on demand-strip of labels mode, the controller controls the label dispenser to automatically dispense a continuous strip of labels in response to a detected absence of a label dispensed from the device. In a manual strip of labels mode, the controller controls the dispenser to dispense a continuous strip of labels in response to the actuation of the manual actuator. In a further mode, the controller automatically dispenses one label or one strip of labels in response to a detected absence of a label dispensed from the device until a user defined number of labels or strips of labels has been automatically dispensed so as to provide a limited on-demand mode.

In accordance with the present invention, the label dispenser may further take the form of a table top printer or a hand held printer wherein the controller controls the printer to print information on a label before the label is dispensed. These and other objects, advantages and novel features of the present invention as well as details of an illustrated embodiment thereof, will be more fully understood from the following description and the drawing.

DETAILED DESCRIPTION OF THE PREFERRED EMBODIMENT

Figure 1:
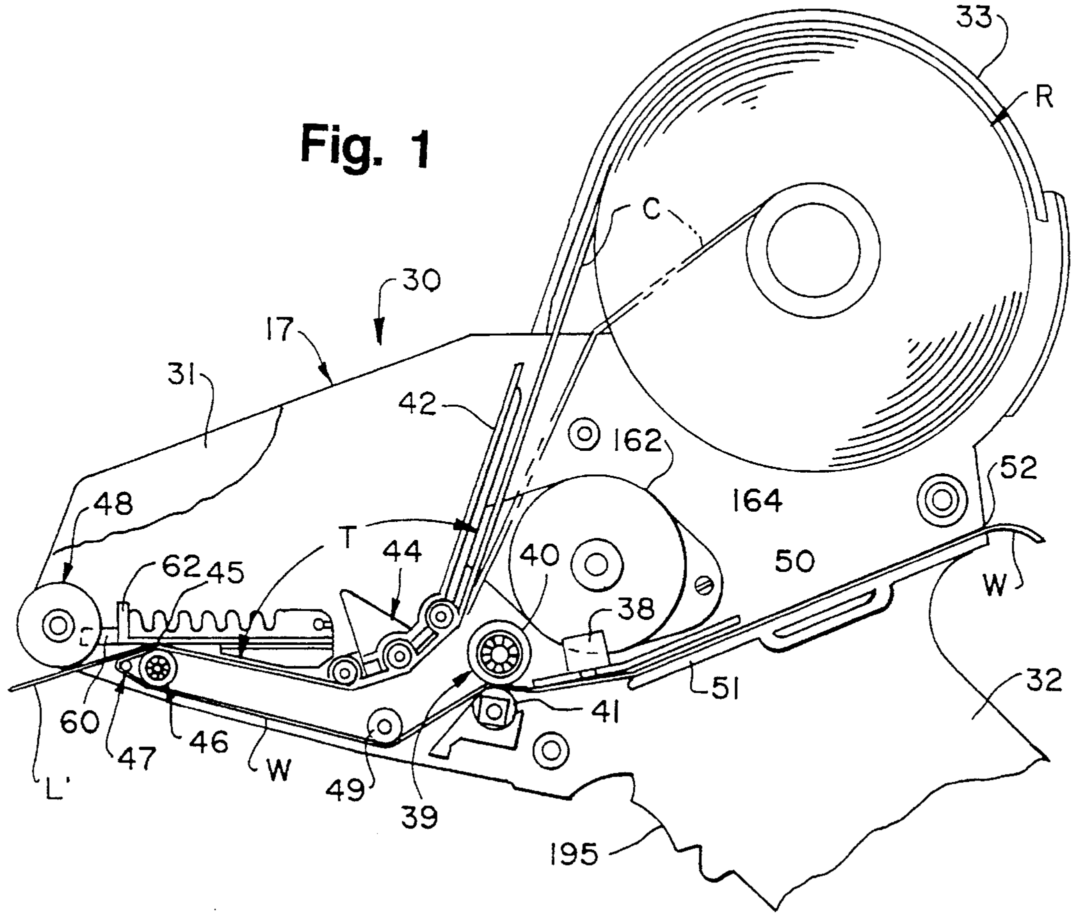
FIG. 1 is a diagrammatic side elevational view of a hand held labeler in accordance with an embodiment of the present invention.

A label dispenser in accordance with the present invention is shown in FIG. 1 in the form of a hand held labeler 30. The labeler 30 includes a frame or housing 31 having a handle 32. The housing 31 suitably mounts a label supply roll R. The roll R is shielded from ambient conditions such as dust by a cover 33. The roll R is comprised of a composite label web C shown in both solid lines representing a full roll and phantom lines representing a nearly fully depleted roll. The composite web C includes a carrier web W having a coating of release material such as silicone wherein labels are releasably secured by a pressure sensitive adhesive to the release material.

The composite label web C is paid out of the roll R when an advancing or feeding mechanism generally indicated at 39 is operated. The feeding mechanism 39 includes a resilient driving roll 40 and a cooperating serrated metal idler roll 41. The composite web C passes from the roll R and about a guide 42 to between a printhead 45 and a cooperating platen generally indicated at 46. The printhead 45 has a straight line of closely spaced printing elements which extends perpendicular to the path of travel of the composite web C. A delaminator generally indicated at 47 comprises a peel roller positioned closely adjacent the line of pressure contact between the printhead 45 and the platen 46. The carrier web W passes partly about the delaminator 47 to effect delamination of the leading label L'. The leading label L' is dispensed into label applying relationship with respect to an applicator generally indicated at 48. From the delaminator 47, the carrier web W passes again into contact with the platen roller 46 and from there partly about a guide roller 49 to between the nip of the rolls 40 and 41. The carrier web W has enough stiffness to be pushed along guides 50 and 51 and to exit through an opening 52 in the housing 31 at a point above and beyond the handle 32.

Figure 7:
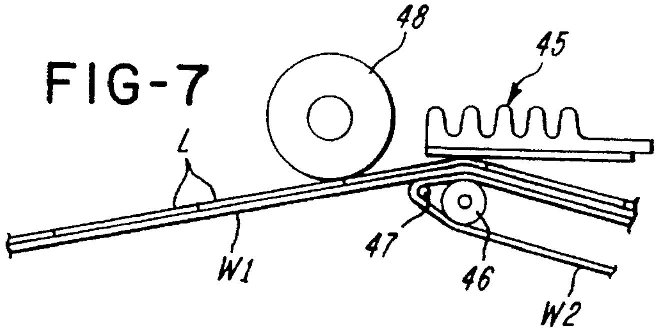
FIG. 7 is a diagrammatic view of a portion of the hand held labeler of FIG. 1 illustrating the dispensing of a strip of labels having two carrier webs.
Figure 8:
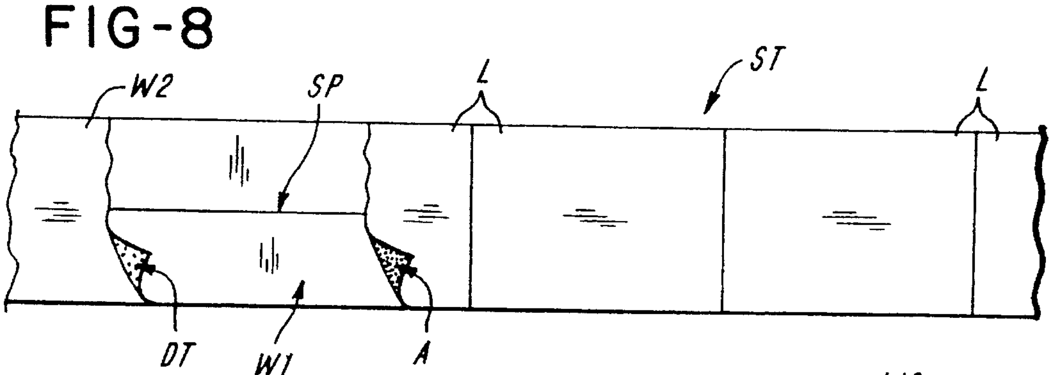
FIG. 8 is a top plan view of a strip of labels with two carrier webs as shown in FIG. 7.
Figure 9:
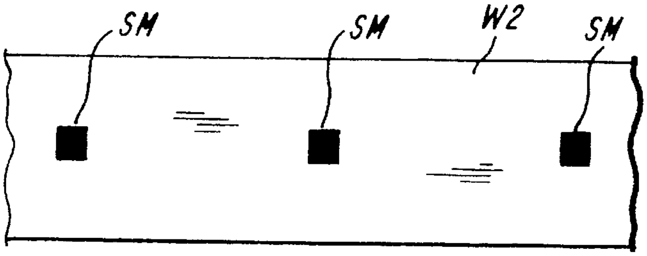
FIG. 9 is a bottom plan view of the strip of labels shown in FIG. 8.

In order to print a strip of labels with the labeler depicted in FIG. 1, labels carried on a two-ply carrier web are utilized. More particularly, as shown in FIG. 8, a strip ST of labels L are adhered to a first carrier web W1 by a pressure sensitive adhesive A. This first carrier web W1 may be split longitudinally as shown at SP. The first carrier web W1 is adhered to a second carrier web W2 by dry tack DT or the like. As shown in FIG. 9, the bottom of the carrier web W2 includes a number of sense marks SM that are used to properly position the web for printing. As shown in FIG. 7, when printing a strip of labels, the carrier web W2 passes about the delaminator peel roll 47 and again into contact with the platen roll 46 as shown for the web W in FIG. 1. However, the first carrier web W1 is dispensed with the labels L still adhered thereto such that the labels adhered to the carrier web W1 forms the strip of labels that is dispensed in accordance with the strips of labels feature of the present invention as described in detail below.

Figure 3:
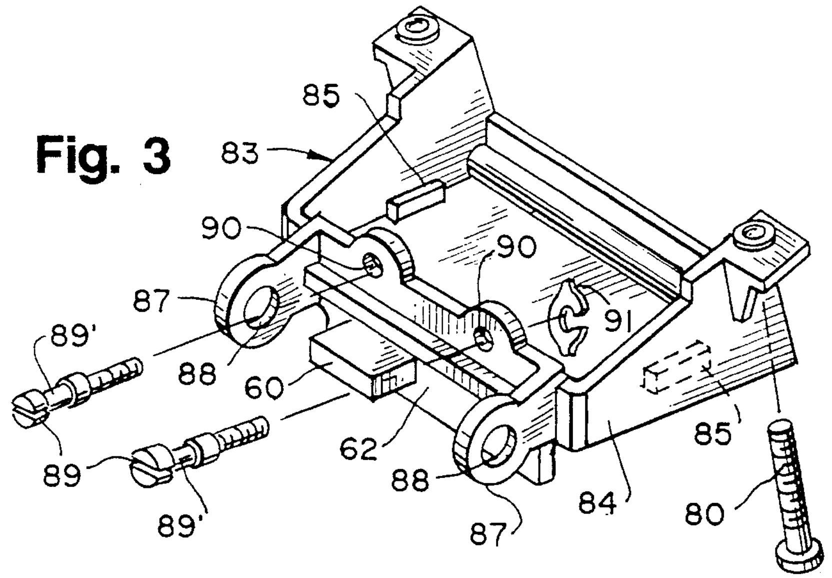
FIG. 3 is an exploded perspective view of the mounting of the sensor depicted in FIGS. 1 and 2.
Figure 2:
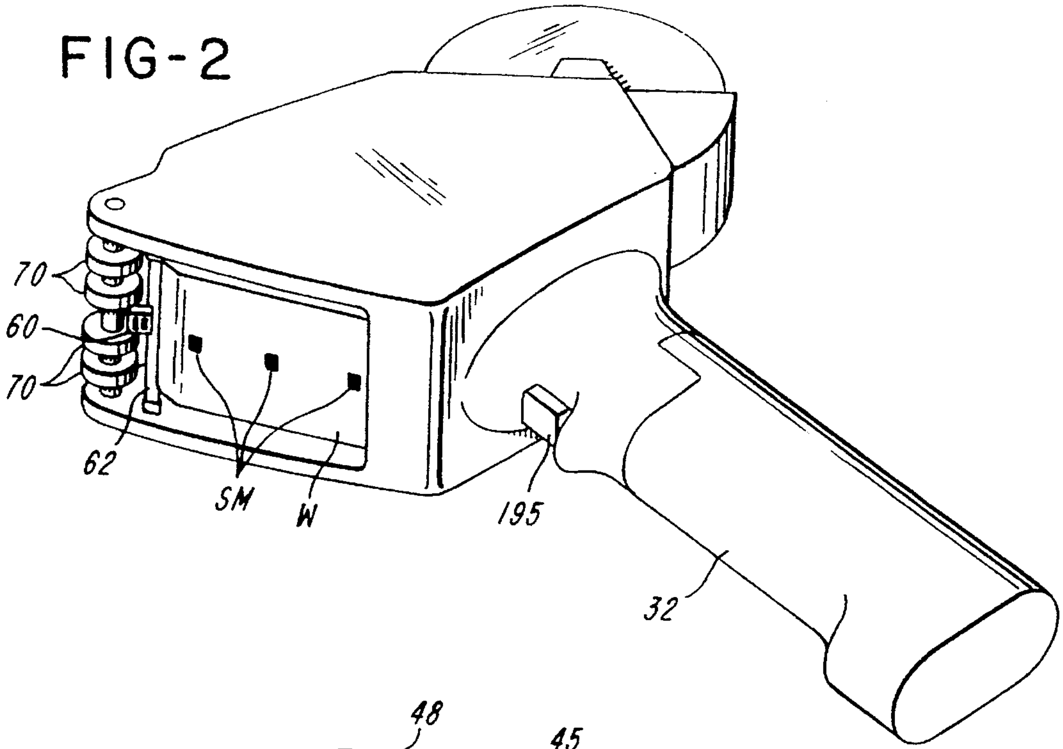
FIG. 2 is a perspective bottom view of the hand held labeler illustrated in FIG. 1.

In order to detect the presence or absence of a label L' as it is dispensed from the labeler 30 for automatic or on demand dispensing, the labeler 30 includes a sensor 60. The on-demand sensor 60 is mounted on a crossbar 62 that is, in turn, mounted on the labeler 30 such that the sensor 60 is slightly downstream of the delaminator 47. The on-demand sensor 60 may take the form of an infrared sensor or the like that detects the presence or absence of a label and provides a signal representative thereof to a controller 11. As shown in FIG. 3, the crossbar 62 upon which the sensor 60 is mounted forms a portion of a support generally indicated at 83. The support 83 includes a member 84 having spaced guides 85 for loosely and slidably guiding a mounting member of the printhead 45. The member 84 has spaced tabs 87 having aligned round holes 88 that receive a shaft 68 upon which applicator rollers 70 are rotatably mounted. A pair of screws 80 secure the support 83 to a section of the labeler 30. Further, a pair of adjusting screws 89 pass through oversized holes 90 in the member 84 through C-rings 91 and are threadably received in threaded members that are secured in respective holes of a printhead mounting member.

Figure 4:
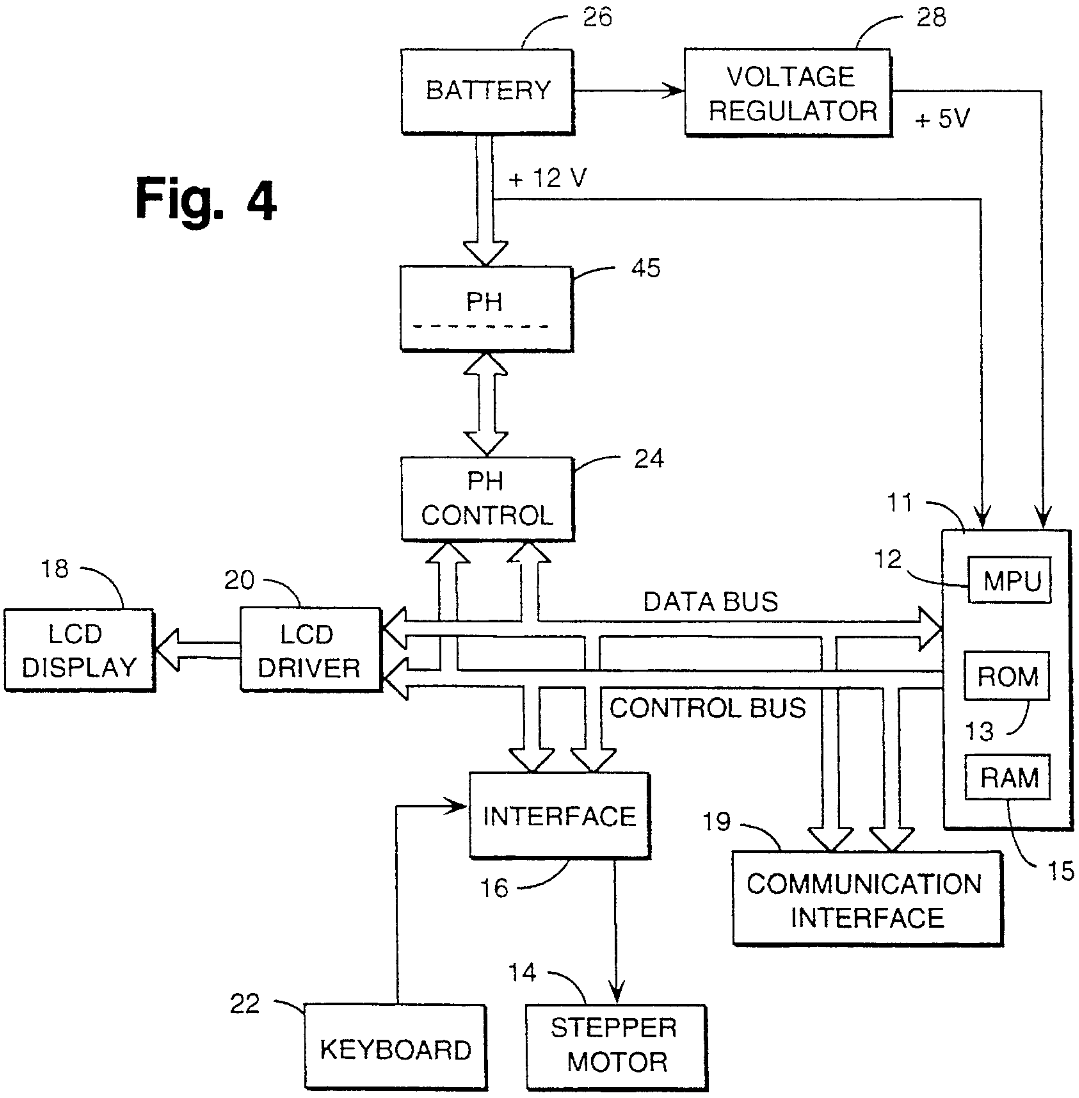
FIG. 4 is a block diagram of the hand held labeler depicted in FIG. 1.

As shown in FIG. 4, the labeler 30 includes a controller 11 with a microprocessor 12 for controlling a stepper motor 14 through an interface 16 to move the composite web C in a direction perpendicular to the line of print elements of the printhead 45 so as to print information on a label. The microprocessor 12 also controls a liquid crystal display, LCD 18, through an LCD driver 20 to display various prompts to a user of the labeler 30. The user may respond to displayed prompts via a keyboard 22 coupled to the controller 11 through the interface 16. The keyboard 22 and the display 18 may be mounted on an upper surface 17 of the labeler 30, as shown in FIG. 1. A key of the keyboard 22 may be assigned as a trigger key; however, preferably the trigger key or switch is mounted on the handle 32 of the labeler 30 as shown at 195. Actuation of the trigger switch when the labeler 30 is in the manual mode causes the labeler under control of the controller 11 to print and dispense a label. The controller 11 is further coupled to a printhead control 24 that is responsive thereto to drive the printhead 45 as powered by a battery 26 to print information on a label. The output of the battery 26 is also applied to a voltage regulator 28 that provides +5 volts to the microprocessor 12.

The microprocessor 12 controls the thermal printhead 24, the stepper motor 14, and the LCD display 18 in accordance with software stored in a read only memory, ROM 13. The microprocessor 12 utilizes portions of a random access memory RAM 15 as working registers in which data is manipulated. Another portion of the RAM 15 is utilized to store a bit mapped image of information to be printed on a label wherein each bit identifies whether a particular print element associated therewith should be on or off for a given row of information forming the label. The labeler 30 also includes a communication interface 19 such as a standard RS 232 communication interface that allows a host device, such as a host computer, to communicate with the labeler 30 in an on-line mode of operation.

The labeler 30 has a number of dispensing modes wherein the microprocessor 12 is responsive to the detection of various events to print and dispense one or more labels depending upon the dispense mode of the labeler. For example, when the labeler 30 is operated off-line, the labeler 30 is responsive to the user selection of an on-demand mode to print and dispense individual labels automatically or on demand whenever a previously printed label is removed from the labeler 30, clearing the sensor 60. If a strip mode is enabled with the on-demand mode when operating off-line, the labeler 30 automatically prints a continuous strip of labels as predefined by the strip length whenever the sensor 60 is cleared. In a manual mode, the labeler 30 is responsive to the manual actuation of a trigger mounted on the handle of the labeler 30 to print and dispense a label. The strip mode may also be enabled to operate in the manual mode such that whenever the trigger is actuated and the strip mode is enabled when operating off-line, the labeler 30 prints a strip of labels of predefined length. The user selects the desired dispense mode of the labeler 30 when operating off-line by entering commands via the keyboard 22 of the labeler to enable the on-demand sensor and/or to enable the strip mode. When the user enables the strip mode by entering the appropriate command via the keyboard 22 of the labeler 30, the labeler 30 prompts the user via the liquid crystal display 20 to enter the number of labels to be printed and dispensed in a continuous strip.

The labeler 30 can also be operated on-line. When operated on-line, the dispense mode may be selected by commands downloaded to the labeler 30 from a host device via the RS 232 communication interface 19. For example, the on-demand mode may be enabled by a command LE entered into the labeler via the RS 232 communication interface 19 and the on-demand mode may be disabled by a command LD also entered via the RS 232 communication interface. The host device may also transmit an on-line trigger command to the labeler 30 via the RS 232 communication interface 19 wherein the labeler 30 responds to the on-line trigger command whenever the on-demand mode is disabled to print and dispense a label.

For on-line operation, the labeler operates in six print and dispense modes including the on-line trigger mode, on-line trigger-strips of labels mode, on-demand mode, on-demand strips of labels mode, limited on-demand mode and limited on-demand-strips of labels mode. In the on-line trigger mode, the labeler 30 responds to an on-line trigger command to print and dispense a label whenever the on-demand feature is disabled and the strips of labels feature is disabled. Manual actuation of the trigger key when the on-demand feature and strips of labels feature are disabled also causes one label to be printed and dispensed. If operating on-line and the on-demand feature is disabled and the strips of labels feature is enabled, one strip of labels of a specified quantity will be printed and dispensed in response to receipt of an on-line trigger command. When in the on-demand mode and the on-demand feature is enabled and the strips of labels feature is disabled, one label is automatically printed and dispensed when the sensor 60 is cleared due to the removal or application of a previously printed and dispensed label, for example. If the on-demand feature is enabled, the on-demand sensor 60 has priority such that an on-line trigger received while the labeler is operating in the on-demand mode will be ignored. In an on-demand strips of labels mode where both the on-demand feature and the strips of labels feature are enabled, one strip of labels of a specified quantity is automatically printed and dispensed when the sensor 60 is cleared due to the removal of a label blocking the sensor. In the limited on-demand mode where the on-demand feature is enabled, the strips of labels feature is disabled and a quantity trigger command specifying the quantity of labels to be printed is received, one label is printed and dispensed each time a label blocking the sensor is removed until the specified quantity of labels has been printed and dispensed. When the specified number of labels has been printed and dispensed, a further label will be printed and dispensed in response to manual actuation of the trigger switch, for example. Printing in this mode can be aborted by actuation of the trigger switch or a key of the keyboard prior to the printing and dispensing of the predetermined number of labels. It is noted that, in this mode, the predetermined number of labels is user defined and variable, the predetermined number being communicated to the labeler 30 via the RS 232 communication interface. In the limited on-demand-strips of labels mode where the on-demand and strips of labels features are enabled and a quantity trigger command indicating the number of strips to be printed and dispensed is received, one strip of labels is printed and dispensed each time the label blocking the sensor 60 is removed until the quantity of strips specified in the quantity trigger command has been printed and dispensed or this mode is aborted.

Figure 5:
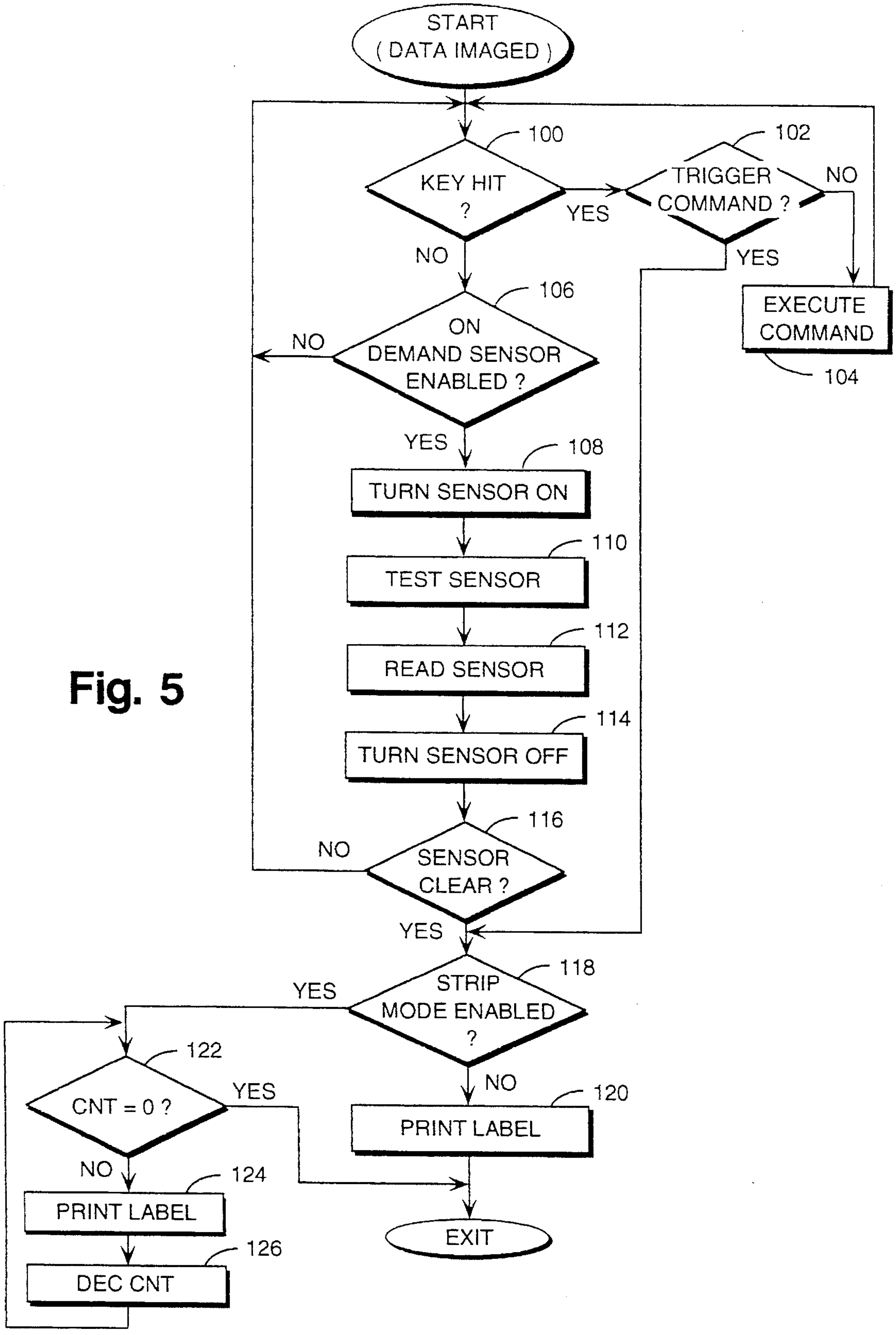
FIG. 5 is a flow chart illustrating an off-line print and dispense routine implemented by the hand held labeler depicted in FIG. 1.

Off-line operation of the labeler 30 in printing and dispensing labels according to the various off-line dispense modes is illustrated in FIG. 5. When information to be printed on one or more labels has been imaged in the bit mapped memory of the RAM 15, the microprocessor 12 determines at a block 100 whether a key on the keyboard 22 of the labeler 30 has been actuated or not. If the microprocessor 12 determines that a key has been actuated, the microprocessor proceeds to block 102 to determine whether the actuated key is the trigger switch. If so, the microprocessor 12 proceeds from block 102 to block 116 to print and dispense one label or a strip of labels depending upon whether the strip mode of the labeler 30 has been enabled or not. If the microprocessor 12 determines at block 102 that the actuated key did not represent the trigger command, the microprocessor 12 proceeds to block 104 to execute the command associated with the actuated key, thereafter returning to block 100.

Figure 10:
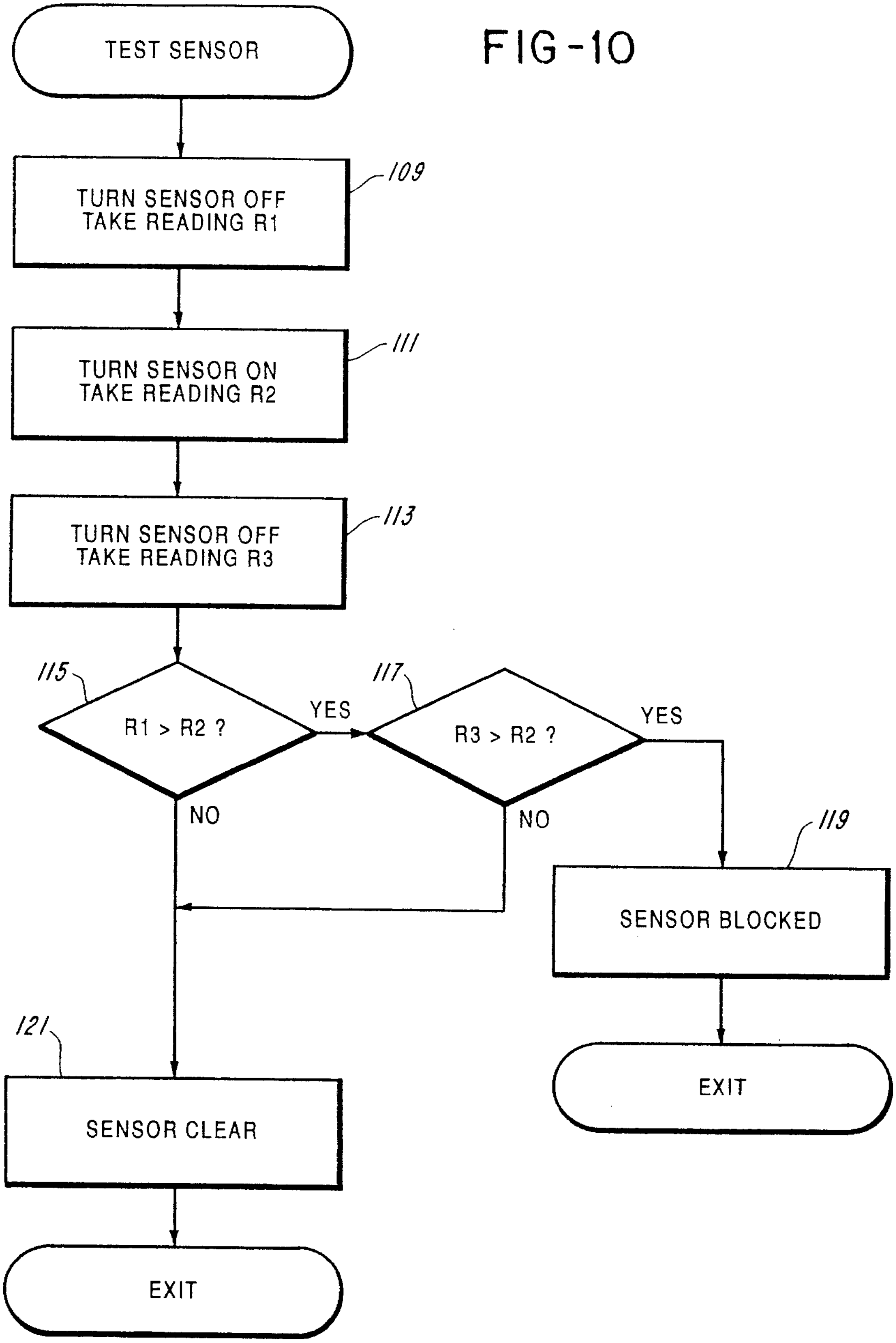
FIG. 10 is a flow chart illustrating a test sensor software routine.

If the microprocessor determines at block 100 that a key has not been actuated, the microprocessor proceeds to block 106 to determine whether the on-demand sensor 60 has been enabled or not. If the on-demand sensor 60 has been enabled, the microprocessor 12 proceeds to block 108 to test the sensor 60 in accordance with the flow chart depicted in FIG. 10. More particularly, at a block 109, the microprocessor 12 turns the light of the sensor 60 off to read the output, R1, of the sensor 60 under ambient light conditions. Thereafter, at a block 111, the microprocessor 12 turns the sensor light on to read the output R2 of the sensor 60 under ambient and sensor light conditions. Thereafter, at block 113, the microprocessor 12 turns the light of the sensor 60 off to read the output R3 of the sensor under ambient light conditions again. If the second sensor output read, R2, is less than the first and third output readings R1 and R3, the sensor is determined to be blocked by a label. Otherwise, it is determined that no label is present. More particularly, the microprocessor 112 at a block 115 determines whether the sensor output reading R1 is greater than the sensor output reading R2. If so, the microprocessor proceeds to block 117 to determined whether the sensor output reading R3 is greater than the sensor output reading R2. If R2 is determined to be less than both R1 and R3, the microprocessor proceeds to block 119 to flag the sensor as being blocked. If, however, the microprocessor 12 determines at block 115 that the sensor output reading R2 is greater than or equal to R1 or if the microprocessor 12 determines at block 117 that the sensor output reading R2 is greater than or equal to the sensor output reading R3, the microprocessor proceeds to block 121 to flag the sensor 60 as being cleared. This test sensor routine ensures that ambient light conditions do not provide false sensor indications. It is noted that prior to implementing the test sensor routine at block 108, the sensor 60 may be turned on and after implementing the test sensor routine the sensor 60 may be turned off so as to power the sensor 60 only when the output of the sensor is to be read. This feature allows power consumption due to the on-demand modes to be reduced. After reading the output of the sensor 60, the microprocessor 12 proceeds to a block 114. At block 114, the microprocessor 12 determines whether the sensor was determined to be clear such that no label was detected during the test sensor routine or whether the sensor is blocked such that a label was detected during the test sensor routine. If the microprocessor determines that the sensor 60 is clear, the microprocessor 12 proceeds to block 116. At block 116, the microprocessor 12 determines whether the strip mode is enabled or not.

If the strip mode is not enabled, the microprocessor 12 proceeds to block 118 to print and dispense a label. If, however, the strip mode is determined to be enabled at block 116, the microprocessor 12 proceeds to block 120. At block 120, the microprocessor 12 determines whether a strip label count is equal to zero and if not, the microprocessor proceeds to block 122 to print and dispense a label. Thereafter, at block 124, the microprocessor 12 decrements the strip label count by one and loops back to block 120. The microprocessor 12 continues to loop through blocks 120, 122 and 124 printing and dispensing labels non-stop or continuously until the strip label count is equal to zero indicating that the user defined number of labels in the strip has been printed and dispensed.

Figure 6A:
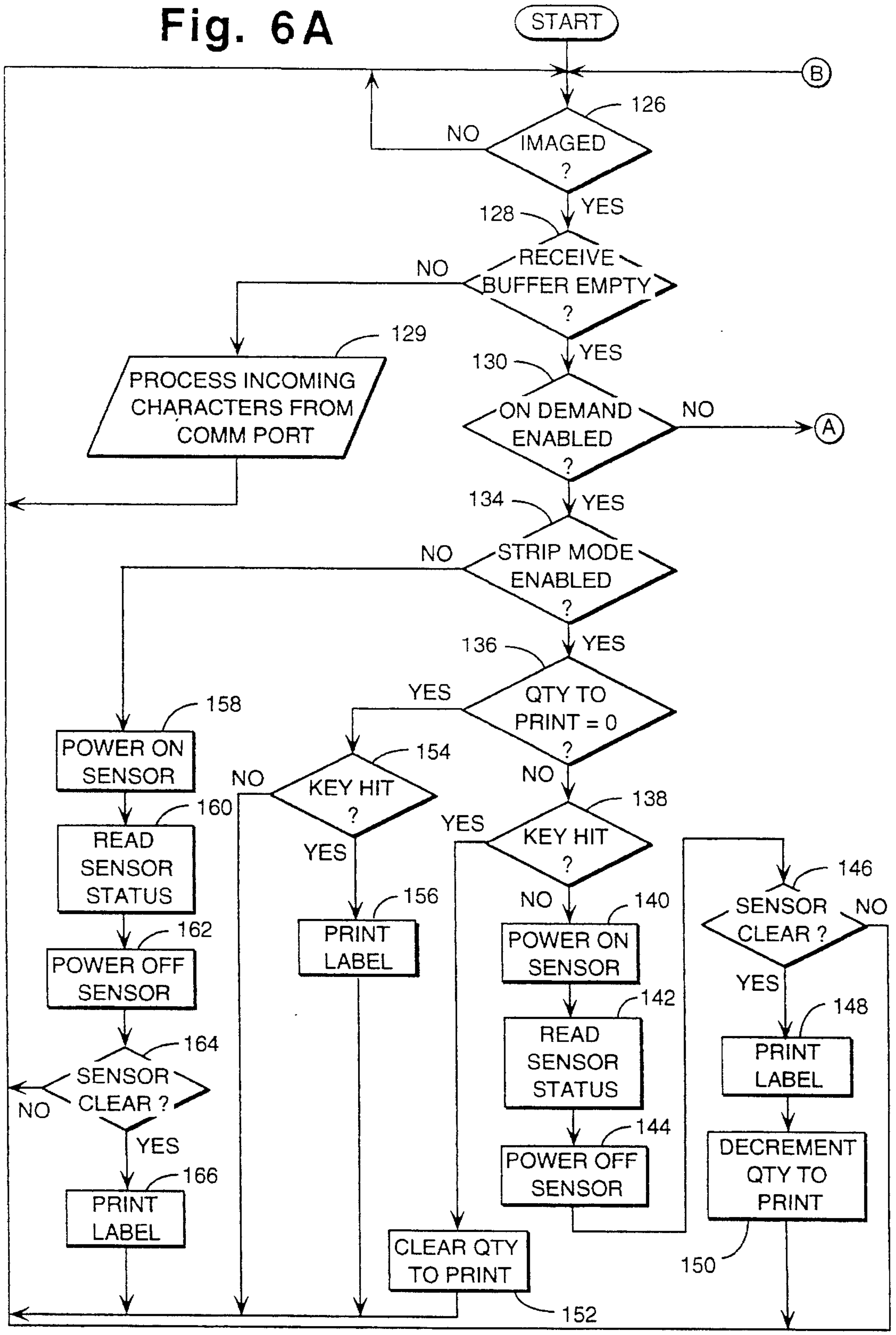
FIGS. 6A–6B form a flow chart illustrating an on-line print and dispense software routine implemented by the hand held labeler depicted in FIG. 1.
Figure 6B:
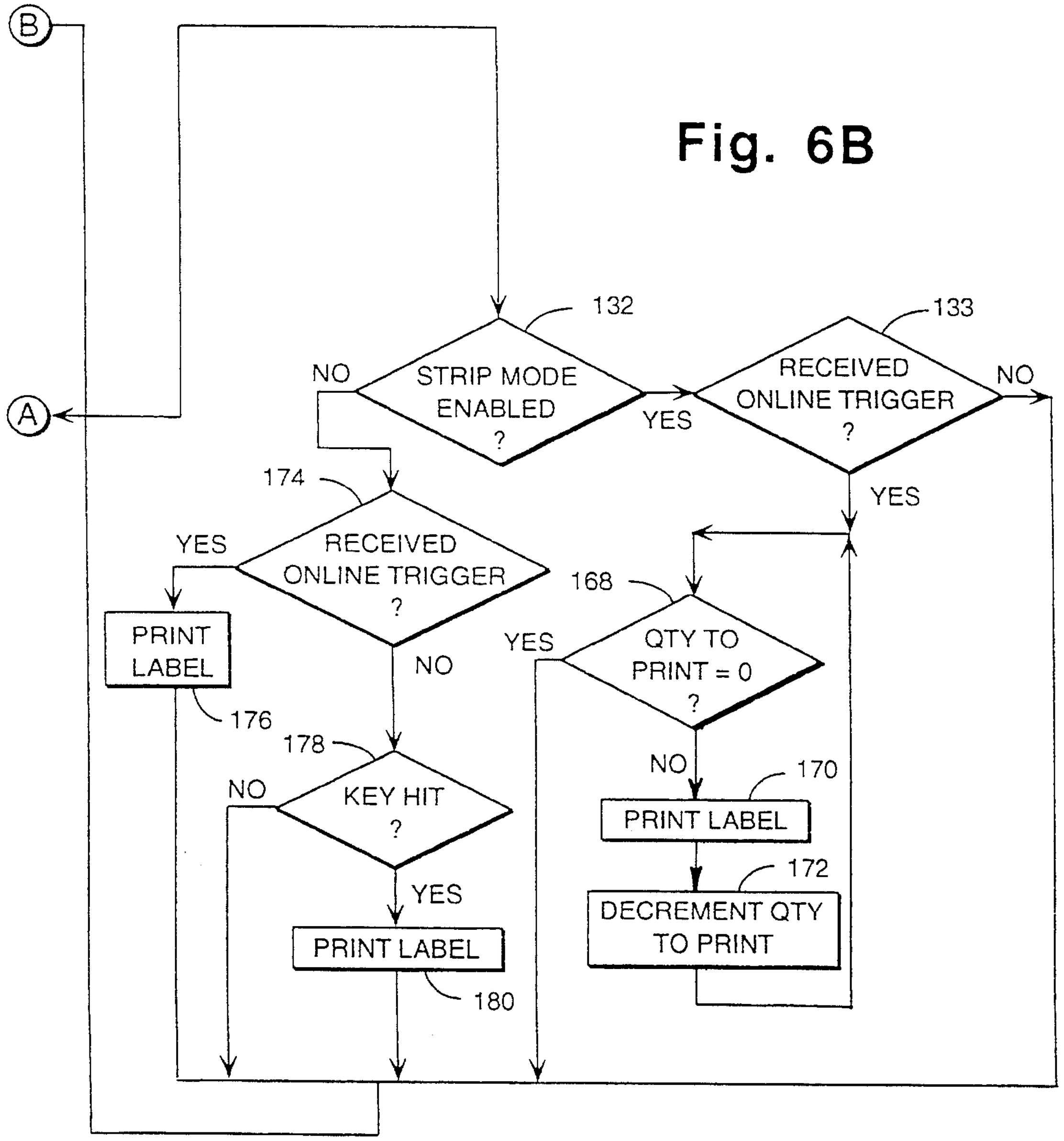

On-line operation of the labeler 30 when printing and dispensing one or more labels is depicted by the routine illustrated in FIGS. 6A and B. At the start of the routine, the microprocessor 12 determines at a block 126 whether data is present in the bit mapped memory of the RAM 15 for information to be printed on one or more labels. If so, the microprocessor 12 proceeds to block 128 to determine whether a receive buffer of the labeler 30 is empty or not wherein the receive buffer of the labeler 30 receives data or characters from the host device via the RS 232 communication interface 19. If the microprocessor 12 determines at block 128 that one or more characters are in the receive buffer, the microprocessor proceeds to block 129 to process the incoming characters from the communication port of the labeler 30. If, however, the receive buffer is empty as determined at block 128, the microprocessor 12 proceeds to block 130 to determine whether the on demand feature is enabled. If so, the microprocessor proceeds to block 134. Otherwise, the microprocessor proceeds to block 162 depicted in FIG. 6B.

If the on-demand feature is enabled as determined by the microprocessor 12 at block 130, the microprocessor proceeds to block 134 to determine whether the strips of labels feature is enabled. If the on-demand feature is enabled but the strips of labels feature is disabled, the microprocessor 12 proceeds to block 138. At block 138 the microprocessor 12 determines whether the quantity to print value is zero. If not, at block 139 the microprocessor 12 determines whether the sensor 60 is clear indicating the absence of a label. If the sensor is clear, the microprocessor at block 140 prints and dispenses one label. Thereafter, the microprocessor determines at block 141 whether the on-demand mode is unlimited such that the quantity to print value is set to FF. If so, the microprocessor 12 proceeds from block 141 to block 126. Otherwise, the microprocessor 12 proceeds to block 142 and decrements the quantity to print value for the limited on-demand mode. From block 142 the microprocessor 12 returns to block 126. If the microprocessor determines at block 139 that the sensor is blocked indicating the presence of a label, the microprocessor 12 returns to block 126 without having printed and dispensed an additional label. If the microprocessor determines at block 138 that the quantity to print value is zero, the microprocessor proceeds to block 144 to determine whether the trigger key or switch has been actuated. If so, the microprocessor 12 proceeds to block 146 to print and dispense one label in response to the manual actuation of the trigger switch. Thereafter the microprocessor 12 returns to block 126.

If the on-demand feature is enabled as well as the strips of labels feature, as determined by the microprocessor at blocks 130 and 134, the microprocessor 12 proceeds from block 134 to block 136. At block 136 the microprocessor 12 determines whether the quantity to print value is zero and if so, the microprocessor proceeds to block 144 as discussed above. If the quantity to print value is not equal to zero, however, the microprocessor 12 proceeds from block 136 to block 148 to determine whether the strip count is zero. If the microprocessor 12 determines that the strip count is equal to zero, the microprocessor proceeds to block 147 to determine whether the on-demand strips of labels mode is unlimited. If it is unlimited, the microprocessor 12 proceeds from block 147 to block 126. If the mode is limited, however, the microprocessor 12 proceeds from block 147 to block 150 to decrement the quantity to print value. Otherwise, the microprocessor proceeds from block 148 to block 152 to determine whether a key of the keyboard 22 has been actuated. If so, the microprocessor proceeds from block 152 to block 154 to clear the quantity to print value to abort the present dispensing mode. If the microprocessor determines at block 152 that a key of the keyboard 22 has not been actuated, the microprocessor proceeds to block 156 to determined whether the sensor is clear. If the sensor 60 is clear as determined by the microprocessor 12 at block 156, the microprocessor proceeds to block 158 to print and dispense a label. Thereafter, the microprocessor proceeds to block 160 to decrement the strip count. From block 160, the microprocessor proceeds to block 148 to again determine whether the strip count is equal to zero or not. If the sensor 60 is blocked as determined at block 156, the microprocessor 12 returns to block 126 from block 156.

If the on-demand feature is disabled, the microprocessor 12 proceeds to block 162 from block 130. At block 162 the microprocessor 12 determines whether the strip mode is enabled. If not, the microprocessor 12 proceeds to block 164 to determine whether an on-line trigger command has been received. If an on-line trigger command has been received, the microprocessor 12 at block 166 prints and dispenses one label. Thereafter, the microprocessor 12 returns to block 126. If the microprocessor 12 determines at block 164 that the on-line trigger command has not been received, the microprocessor proceeds to block 168 to determine whether the trigger key or switch has been actuated. If so, the microprocessor 12 prints and dispenses one label at block 170. Otherwise, the microprocessor 12 returns to block 126.

If the microprocessor determines that the on-demand feature is disabled but that the strips of labels feature is enabled at respective block 130 and 162, the microprocessor proceeds to block 172. At block 172 the microprocessor 12 determines whether an on-line trigger command has been received. If so, the microprocessor proceeds to block 174 to determine whether the strip count is zero. If the strip count is not zero, the microprocessor proceeds to block 176 to print and dispense a label. Thereafter, the microprocessor proceeds to block 178 to decrement the quantity to print value. From block 178 the microprocessor 12 returns to block 174 to determine whether the strip count is equal to zero and if not, another label is printed and dispensed at block 176. The microprocessor continues to loop through blocks 174, 176 and 178 until the microprocessor 12 determines at block 174 that the strip count is equal to zero. When this determination is made, the microprocessor 12 returns to block 126.

The label dispenser/labeler in accordance with the present invention is very flexible in its printing and dispensing operations due to the various dispense modes that are selectable by a user operating the label dispenser/labeler. Further, the label dispenser/labeler is easy to operate and requires only minimal input from a user in order to dispense or print and dispense labels individually or in strips.

Many modifications and variations of the present invention are possible in light of the above teachings. Thus, it is to be understood that, within the scope of the appended claims, the invention may be practiced otherwise than as described hereinabove.

We claim:

1. A device for dispensing pressure sensitive labels, said device being selectively operable in a plurality of dispensing modes including an automatic dispense mode and a manual dispense mode, comprising:

means for entering a dispensing mode according to which said device is to be operable, said entered mode being selected from said plurality of dispensing modes;

means for detecting a plurality of different label dispense initiation events; and means for controlling said device to dispense labels in response to the detection of different label dispense initiation events depending upon said selected dispensing mode.

2. A device for dispensing labels as recited in claim 1 wherein said device includes a sensor for detecting the presence or absence of a label dispensed from said device, and said control means is responsive to the selection of said automatic dispense mode to control said device to automatically dispense at least one label in response to a detected absence of a label dispensed from said device.

3. A device for dispensing labels as recited in claim 2 wherein said plurality of modes includes a limited automatic dispense mode wherein said control means automatically dispenses at least one label in response to a detected absence of a label dispensed from said device until a user-defined number of labels has been automatically dispensed.

4. A device for dispensing labels as recited in claim 2 including means for powering said sensor only during operation of said automatic dispense mode.

5. A device for dispensing labels as recited in claim 2 including means for powering said sensor only when it is desired to determine the status of said sensor's output.

6. A device for dispensing labels as recited in claim 1 wherein said device includes a manual actuator mounted on said device and said control means is responsive to the selection of a manual dispense mode to dispense at least one label in response to the actuation of said manual actuator.

7. A device for dispensing labels as recited in claim 1 wherein said entering means includes means for receiving communications from a host device including a command to initiate label dispensing and said control means is responsive to the receipt of said initiate label dispensing command from said host device to dispense a label when said dispensing device is in a first mode.

8. A device for dispensing labels as recited in claim 7 wherein said control means does not dispense a label in response to the receipt of said initiate label dispensing command from said host device when said dispensing device is in a second mode.

9. A device for dispensing labels as recited in claim 1 wherein said plurality of modes includes a strip mode and said control means is responsive to the selection of said strip mode to dispense a continuous strip of labels.

10. A device for dispensing labels as recited in claim 9 wherein said device includes a sensor for detecting the presence or absence of a label dispensed from said device and said control means is responsive to the selection of an automatic strip mode to automatically dispense a continuous strip of labels in response to a detected absence of a label dispensed from said device.

11. A device for dispensing labels as recited in claim 9 wherein said device includes a manual actuator mounted on said device and said control means is responsive to the selection of a manual strip mode to dispense a continuous strip of labels in response to the actuation of said manual actuator.

12. A device for dispensing labels as recited in claim 1 wherein said device includes a printer for printing information on said labels.

13. A hand held labeler for printing and dispensing labels, said labeler being selectively operable in a plurality of dispensing modes including an automatic dispense mode and a manual dispense mode, comprising:

means for printing labels;

means for applying printed labels;

means for entering a dispensing mode according to which said labeler is to be operable, said entered mode being selected from said plurality of dispensing modes;

means for detecting a plurality of different label dispense initiation events; and means for controlling said labeler to dispense printed labels in response to the detection of different label dispense initiation events depending upon said selected dispensing mode.

14. A labeler for dispensing labels as recited in claim 13 wherein said labeler includes a sensor for detecting the presence or absence of a label dispensed from said labeler, and said control means is responsive to the selection of said automatic dispense mode to control said labeler to automatically dispense at least one label in response to a detected absence of a label dispensed from said labeler.

15. A device for dispensing labels, said device being selectively operable in a plurality of dispensing modes including an automatic dispense mode and a manual dispense mode, comprising:

means for entering a dispensing mode selected from said plurality of dispensing modes;

a sensing mechanism for detecting the presence or absence of a label dispensed from said device;

a manual actuator mounted on said device;

a communication interface for receiving communications from a host device including a command to initiate label dispensing; and means for selectively controlling said device to dispense labels in response to said sensing mechanism, said manual actuator or said initiate label dispensing command depending upon said selected dispensing mode.

16. A device for dispensing labels as recited in claim 15 wherein said control means is responsive to the selection of an automatic dispense mode to control said device to automatically dispense at least one label in response to a detected absence of a label dispensed from said device.

17. A device for dispensing labels as recited in claim 15 wherein said control means is responsive to the selection of a limited automatic dispense mode to control said device to automatically dispense at least one label in response to a detected absence of a label dispensed from said device until a user defined number of labels has been automatically dispensed.

18. A device for dispensing labels as recited in claim 15 including means for powering said sensing mechanism only during operation of an automatic dispense mode.

19. A device for dispensing labels as recited in claim 15 including means for powering said sensing mechanism only when the status of said sensing mechanism's output is to be determined.

20. A device for dispensing labels as recited in claim 15 wherein said control means is responsive to the selection of a manual dispense mode to dispense at least one label in response to the actuation of said manual actuator.

21. A device for dispensing labels as recited in claim 15 wherein said control means is responsive to the receipt of said initiate label dispensing command from said host device to control the dispensing of a label when said dispensing device is in a first mode.

22. A device for dispensing labels as recited in claim 21 wherein said control means does not dispense a label in response to the receipt of said initiate label dispensing command from said host device when said dispensing device is in a second mode.

23. A device for dispensing labels as recited in claim 15 wherein said plurality of modes includes a strip mode and said control means is responsive to the selection of said strip mode to dispense a continuous strip of labels.

24. A device for dispensing labels as recited in claim 23 wherein said control means is responsive to the selection of an automatic strip mode to automatically dispense a continuous strip of labels in response to a detected absence of a label dispensed from said device.

25. A device for dispensing labels as recited in claim 23 wherein said control means is responsive to the selection of a manual strip mode to dispense a continuous strip of labels in response to the actuation of said manual actuator.

26. A device for dispensing labels as recited in claim 15 wherein said device includes a printer for printing information on said labels.

27. A device for dispensing pressure sensitive labels releasably adhered to a carrier web of a composite label web, comprising:

a manually operable actuator;

means for printing on a label;

means for advancing the composite label web to the printing means;

means for delaminating a printed label from a carrier web;

means for sensing the presence or absence of a label beyond the printing means;

means for entering the number of labels to be printed in a label strip;

means for entering one dispensing mode selected from a plurality of dispensing modes, the modes including a first mode wherein a label is printed and dispensed upon each actuation of the actuator, a second mode wherein a label is printed and dispensed when the absence of a label is sensed by the sensing means, a third mode wherein a label strip is printed and dispensed upon each actuation of the actuator with the number of labels in the strip being equal to a number entered via said entering means, and a fourth mode wherein a label strip is printed and dispensed when the absence of a label is sensed by the sensing means with the number of labels in the strip being equal to a number entered via said entering means.

28. A device for dispensing pressure sensitive labels as recited in claim 27 wherein said composite label web includes a first carrier web on which said labels are adhered and a second carrier web on which said first carrier web is adhered, said delaminating means delaminating said first carrier web from said second carrier web when dispensing a label strip in said third or fourth mode.

29. A device for dispensing pressure sensitive labels as recited in claim 27 further including means for receiving communications from a host device including a command to initiate label printing and wherein said plurality of modes includes a fifth mode wherein a label is printed and dispensed in response to the receipt of said initiate label printing command and a sixth mode wherein a label strip is printed and dispensed in response to the receipt of said initiate label printing command.

30. A device for dispensing pressure sensitive labels as recited in claim 27 further including means for receiving communications from a host device including a command to limit the number of label strips printed and dispensed in said fourth mode.

31. A device for dispensing pressure sensitive labels as recited in claim 27 further including means for receiving communications from a host device including a command to limit the number of labels printed and dispensed in said second mode.

32. A device for dispensing pressure sensitive labels as recited in claim 27 wherein said sensing means includes a sensor light and means for testing the operation of said sensing means in ambient light alone with said sensor light off.

33. A device for dispensing pressure sensitive labels releasably adhered to a carrier web of a composite label web, comprising:

means for printing on a label; means for advancing the composite label web to the printing means; means for delaminating a printed label from the carrier web; means for sensing the presence or absence of a label beyond the printing means; means for selectively entering a dispensing mode selected from a plurality of dispensing modes; and an actuator, wherein the printing means and the advancing means are operated to print and dispense a label in a first mode upon actuation of the actuator, and wherein the printing means and the advancing means are operated to print and dispense a label in a second mode under control of the sensing means, and means including a microprocessor for operating the printing means and the advancing means in accordance with the mode selected.

* * * * *